Figure 3:
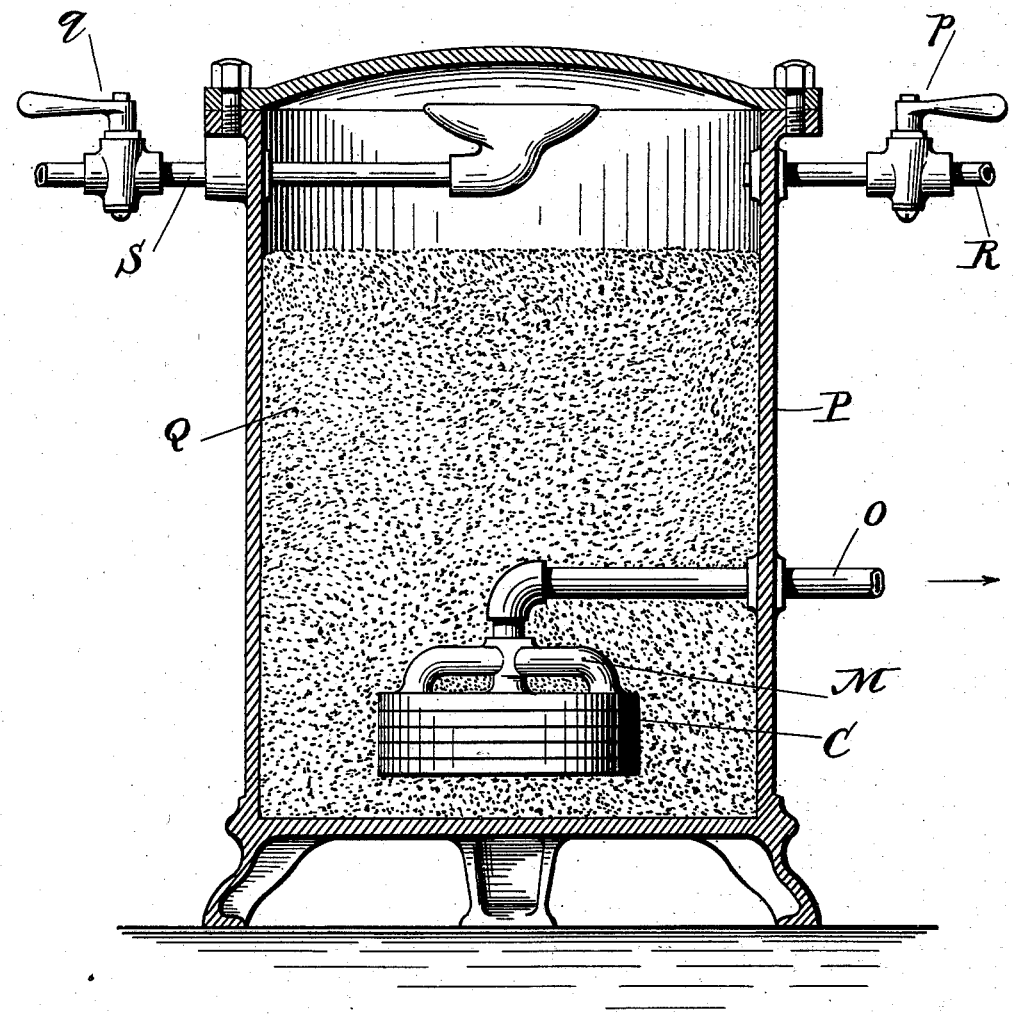

No. 651,901. Patented June 19, 1900.
C. E. TORRANCE.
FILTER VALVE.
(Application filed Feb. 21, 1899.)
(No Model.) 2 Sheets—Sheet 1.
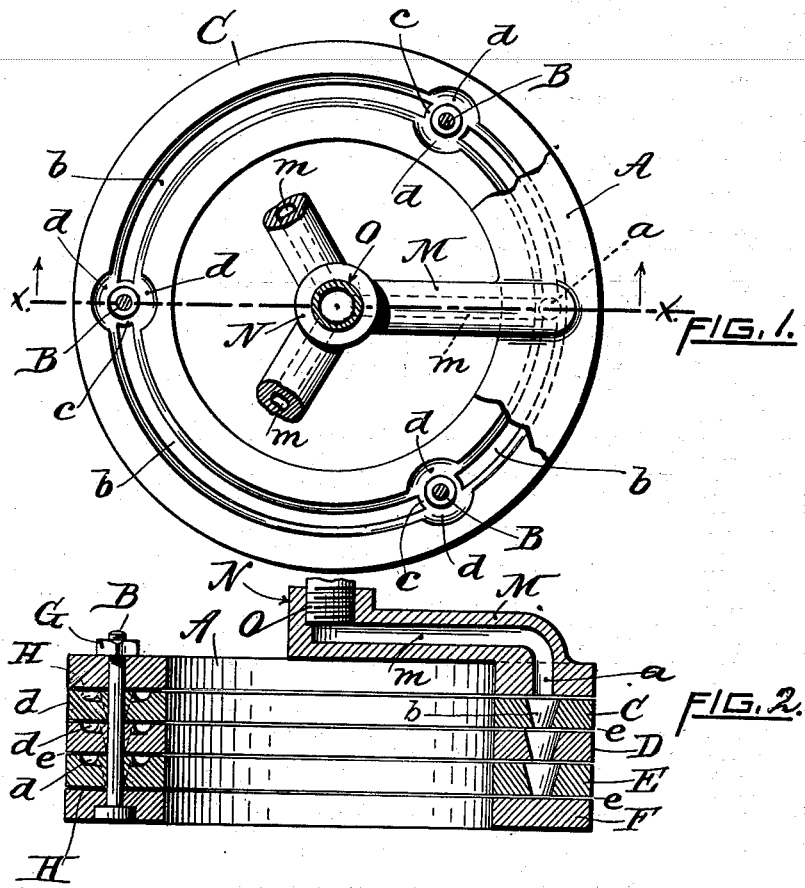
WITNESSES.
Charles T. Hannigan.
Charles H. Brown
INVENTOR.
Charles E. Torrance
By Warren R. Perce
Atty.
THE NORRIS PETERS CO., PHOTO-LITHO., WASHINGTON, D. C.

No. 651,901. Patented June 19, 1900.
C. E. TORRANCE.
FILTER VALVE.
(Application filed Feb. 21, 1899.)

(No Model.) 2 Sheets—Sheet 2.

WITNESSES.
Charles T. Hannigan.
Howard A. Lamprey

INVENTOR.
Charles E. Torrance
By Warren R. Perce
Atty.

UNITED STATES PATENT OFFICE.

CHARLES E. TORRANCE, OF NORTHAMPTON, MASSACHUSETTS.

FILTER-VALVE.

SPECIFICATION forming part of Letters Patent No. 651,901, dated June 19, 1900.

Application filed February 21, 1899. Serial No. 706,364. (No model.)

*To all whom it may concern:*

Be it known that I, CHARLES E. TORRANCE, of the city of Northampton, in the county of Hampshire, in the State of Massachusetts, have invented a certain new and useful Improvement in Filter-Discharge Devices; and I declare the following to be a specification thereof, reference being had to the accompanying drawings.

Like letters indicate like parts.

Figure 1 is a top plan of my improved filter-discharge device when made of a series of rings. Fig. 2 is a diametrical section of the same as seen on line $x$ $x$ of Fig. 1. Fig. 3 is a vertical diametrical section of the tank or case wherein my improved filter-discharge device is placed.

My invention relates to discharge devices to be used in a filtering-tank which contains filtering material, as sand or gravel. It is intended to prevent the passage of any of the filtering material from the tank into the collecting pipes or tubes which discharge into the reservoir or receptacle for the filtered water and also to facilitate the cleaning of such discharge device by a reverse current of water.

My invention consists of a number of rings, each having an annular channel or waterway extending through it from top to bottom, except where interrupted by radially-arranged webs, and there provided with curved grooves upon the upper surface of the ring, a solid bottom ring, and a solid top ring, which has apertures and also collecting-pipes therefrom to conduct the filtered water to a proper reservoir or receptacle, in combination with bolts passing through said top and bottom rings and through the webs of the channeled rings, respectively, washers upon said bolts adapted to separate said rings slightly from each other, respectively, to allow the flow of water between them, and nuts engageable with said bolts and serving to clamp all said parts together, as hereinafter particularly described.

In the drawings, A represents the upper circular ring, which is solid, except where perforated for the passage of the fastening-bolts B and for the flow of water, as at $a$.

C, D, and E are circular rings, each having an annular channel $b$ extending around and through it midway between the inner and outer edges thereof, the sides of said channels $b$ being beveled, as shown in Figs. 1 and 2. At $c$ $c$ $c$ in each of said rings C, D, and E are webs which extend across the annular channel and serve to unite the two portions of the ring. Each web $c$ is perforated for the passage of one of the bolts B, and the upper surface of each of said rings C, D, and E is provided with curved grooves $d$ to conduct the water around the bolts B, respectively, so that said grooves $d$ and channels $b$ in each ring form a continuous waterway. The bottom ring F is solid, except where perforated and socketed for the passage of the bolts B, said bolts being shown in the drawings as three in number equidistant from each other, the head of each bolt being received in a corresponding socket in the ring F, as plainly seen in Fig. 2, the shank of each bolt B passing through one of the radial webs $c$ of the rings C, D, and E and being provided with a nut G, engaging the top of the bolt.

Surrounding the bolts B and placed between the rings A and C, the rings C and D, the rings D and E, and the rings E and F are washers H, made, preferably, of very thin sheet metal. The bolts B by their heads and the nuts G clamp together all the rings with the interposed washers H.

A three-branched collecting-pipe M has the bores $m$, which at their outer ends are curved and made continuous with the openings $a$ of the ring A. The branches of the collecting-pipe M are radial, and they meet and communicate with a common tube N, which is engageable by screw-threads with the pipe O, leading to a reservoir. (Not shown.) By this construction and arrangement the rings are held together firmly in the manner illustrated in the drawings and are separated from each other a distance equal to the thickness of the washers H, thus providing spaces for the inflow or outflow of the water, as shown at $e$ in Fig. 2. In Fig. 3 I show the relation of the said device with the filtering tank or receptacle. P represents said filtering tank or receptacle, which is filled to within a short distance from the top with clean sand or gravel or crushed quartz Q. The water is admitted through the inlet-pipe R, which has in it the cock $p$. S is the outlet-pipe, leading from the tank P, and is provided with the cock $q$.

The action of my improved discharge device is as follows: It is buried in the filtering-bed, of sand, gravel, or other suitable material Q, in the reservoir P, and the water, forced by hydrostatic or artificial pressure, percolates through filtering material, flows through the spaces or interstices $e$ between the rings, and following the annular channels $b$ and passing around the bolts B along the curved grooves $d$ rises up through the bores of the collecting-pipe M and thence into the pipe O, discharging into the outside storage tank or reservoir for the filtered water. (Not shown.)

As seen in Fig. 2, the opening of the branch collecting-pipe M and the aperture $a$ in the ring A are continuous and in the same vertical line with the channel $b$ of the rings C, D, and E.

To cleanse my improved discharge device, the current of water is reversed and flows down through the pipe O and three-branched collecting-pipe M and thence out through the interspaces between the rings, thus dislodging and removing all foreign matter therefrom. As the rings are separated from each other and the top and lower rings (or disks) with an exceedingly-narrow interspace no wider than the thickness of the washers H, of very thin sheet metal, no grains of sand or particles of the filtering substance can pass through, but the water is perfectly strained and rendered free from foreign substances.

It is immaterial in what shape these filter-valves may be. I have shown in the drawings a circular form; but it is obvious that an oblong, rectangular, square, oval, or any other form may be used with the same effect and that as many fastening-bolts or as many branches may be provided for the collecting-pipe as are desired, as also that in the open-ring construction (shown in Figs. 1 and 2) a filter-valve of less size may be placed within the circular opening there shown, in which case, however, the discharge-pipe of the smaller valve should be continuous with the pipe O.

In the use of my improved filter-valve I have the advantage of an extended surface for the ingress and egress of the water, thus giving a great capacity both for the collecting of filtered water in the reservoir or tank and for washing the valve when the current of water is reversed.

I claim as a novel and useful invention and desire to secure by Letters Patent—

1. In a discharge device for a water-filter, the combination of a discharge-tube having branch collecting-pipes therefrom, a top ring with apertures continuous with said branch collecting-pipes, a bottom ring, a ring with an annular channel therein, separated radially by webs, washers between said rings, respectively, and clamping-bolts adapted to fasten all said rings and washers in position, substantially as specified.

2. In a discharge device for a water-filter, the combination of a discharge-tube having branch collecting-pipes therefrom, a top ring with apertures continuous with said branch collecting-pipes, a bottom ring, a plurality of rings, each having an annular channel radially separated by webs, washers between said rings, respectively, and clamping-bolts adapted to fasten all said rings and washers in position, substantially as specified.

3. In a discharge device for a water-filter, the combination of a discharge-tube with branch collecting-pipes therefrom, a top ring with apertures continuous with said branch collecting-pipes, a bottom ring, a plurality of rings each having an annular channel separated by webs at intervals, washers between said rings, respectively, bolts passing through said washers and top and bottom rings and through the webs of said rings, respectively, and curved grooves in the upper surface of the intermediate rings adjacent to the bolts and adapted to conduct water around said bolts, substantially as shown.

CHARLES E. TORRANCE.

Witnesses:
WARREN R. PERCE,
CHARLES H. BROWN.